United States Patent [19]

Kenyon

[11] Patent Number: 4,941,041

[45] Date of Patent: Jul. 10, 1990

[54] PULFRICH ILLUSION TURNTABLE

[76] Inventor: Keith E. Kenyon, 14434 Hamlin St., Ste. 4, Van Nuys, Calif. 91401

[21] Appl. No.: 336,052

[22] Filed: Apr. 11, 1989

[51] Int. Cl.⁵ .............................................. H04N 13/02
[52] U.S. Cl. ...................................... 358/89; 352/86; 358/87; 350/144
[58] Field of Search .................... 358/88, 3, 89, 87; 352/86; 350/144

[56] References Cited

U.S. PATENT DOCUMENTS

| | | | |
|---|---|---|---|
| 3,445,153 | 5/1969 | Marks | 350/144 |
| 4,131,342 | 12/1978 | Dudley | 352/86 |
| 4,705,371 | 11/1987 | Beard | 350/144 |
| 4,836,647 | 6/1989 | Beard | 358/89 |

FOREIGN PATENT DOCUMENTS 54-108523  8/1979  Japan ...................................... 358/22

*Primary Examiner*—Howard W. Britton

[57] ABSTRACT

A method is disclosed that simplifies and makes practical the utilization of the Pulfrich illusion for converting 2-D live television and videotapes into 3-D with or without using shaded lenses, by using a turntable large enough to hold both the cameras and the subjects, on which the scenes are shot with precise motion against the stationary background.

16 Claims, 1 Drawing Sheet

PULFRICH ILLUSION TURNTABLE

BACKGROUND OF THE INVENTION

1. Field of the Invention

This invention relates to apparatus and methods for obtaining deep in-depth perception or three-dimensional images from two-dimensional images as they are projected on a television screen using the Pulfrich illusion.

2. Prior Art

This invention has filed for two solo Patent application, Nos. 317,269 and 325,952 with respect to this illusion and one patent application No. 327,03 that has two other co-inventors with respect to a special camera, designed to shoot the illusion. All of these applications have to do with methods to make the Pulfrich illusion, discovered in the 1920's and rarely used, practical. The reason for its sparse use is that up until now it takes a considerable effort and many different camera takes in order to get good 3-D. Many takes must be wasted.

The special camera, which has a television monitor of more than 5 inches attached to the camera in such a way that the cameraman, wearing a shaded lens over one eye, can see the 3-D as it is being shot to make sure that virtually every take is a good take, also has its limitations. It requires being mounted on a dolly that preferably can run on tracks surrounding the subject being shot. It requires constant motion by the camera in order for the illusion to be seen on the television sets, therefore only short scenes can be shot while the camera is moving parallel to a moving subject, because, quickly, on a stage, for example, one will run out of room. It is especially limited if fairly long dialogue is to take place. By shooting numerous takes, a complete video or film can be finished, but the fact that the camera must always be moving makes a live continuous talk-show or an interview with a person of more than ten seconds or so cumbersome. If it is desireable to have the subject facing the camera all of the time, it is very awkward to do.

Since most talk shows and interview shows are done live and continuously, even if they are taped for later viewing, continuous shooting in 3-D is mandatory, if a truly practical solution to the 3-D problem on television is to be solved. This invention will propose a solution for this long-standing problem.

SUMMARY OF THE INVENTION

First, it is important to understand what it is that makes the Pulfrih illusion work. When motion shows up on a television screen in which color and lighting are optimum, and it can be contrasted with lack of motion with respect to the background and foreground, an illusion takes place in which the eye closest to the direction from which the motion is coming sees the moving subject a fraction of a second prior to the eye further away. This situation presents an illusion of duality to the brain, and it connects the flat pictures that the eye is actually seeing with the depth perception centers in the brain, giving the brain the same kind of signal that we give to it when we look at close-up objects in front of objects further away.

However, with our eyes, looking at the world about us, we do not necessarily need to see movement to see 3-D. With this illusion we do. The Pulfrich illusion is not actually 3-D, but merely the illusion of it provided by the camera in motion, so things are needed to be done to enhance its visualization. These are:

1. Have the moving subject lighted more intensely than the stationary background or foreground objects.
2. Have colors that optimize the illusion, and avoid black, grey or white that de-emphasize it.
3. Have stationary objects in the foreground, including tree trunks or branches to trees hanging down.
4. Make sure that the camera moves parallel to the moving subject and at the same speed.

No. 4 is the limiting aspect. It limits a take to a few seconds in most situations, when we run out of room. It does not allow meaningful dialogue to take place, and it certainly doesn't even allow monologues for more than the few seconds it takes to run out of room. Therefore, an outdoor shoot for longer monologues and dialogues is necessary, unless one were going to use the Astrodome, and ordinary conversation while constantly moving is cumbersome whether indoors or out.

However, as was taught in the previous patent applications, there is one other way to elicit the Pulfrich illusion in which the subject does not need to move. That is to move the camera around the subject in a circle or in an arc of a circle. If this is done, 3-D can be accomplished, and dialogue can be extended, but if the subject or subjects do not continuously turn themselves, they cannot face the camera. This is an awkward situation except, once again, for shots that take only a minimum of time.

However, if it were possible to use the circling technique, yet keep the subjects from having to turn themselves constantly, extended dialogue could be carried out. There is a way for the subject to move right along with the camera as long as the background and foreground props stay still.

This can be accomplished readily by mounting the camera and subject on a turntable with the subject or subjects in the center. Turntables have been used on the stage before, but the cameras have not been put on them along with the subjects, because the cameras did not need to move for those purposes. With the Pulfrich illusion, it is essential that the camera be on the turntable and moving.

The subjects can be seated, stand, or even move about as long as they stay essentially in the center of the turntable. The turntable can have as large a diameter as is needed to accomplish the staged purpose, and several turntables can be used at the same time to enable different types of subjects to be used. For example, an orchestra can occupy one turntable, while a singer or group of singers can occupy a second one. Shots from one can be mixed with shots from the other, both in good 3-D.

Cameras must be placed near the edge of the turntables. Depending on the size of the turntable, any number of cameras can be used, however, only three are needed for most purposes. These cameras usually would be mounted on one side of the turntable to enable the background, which, of course, is stationary because it is off the turntable, to be seen without a camera in view.

The speed of the turntable cannot be so fast that it is uncomfortable for the subjects, nor so slow that the illusion of depth does not appear on the screen. Fortunately, rim speeds of as little as 3 to 5 feet per second can produce in-depth perception for a turntable of around a 10 foot radius.

Foreground material, which also either must be stationary or moving considerably slower than the turntable, can be hung from the ceiling for those scenes shot inside, or mounted from a pole or a fence-type prop surrounding the turntable with stationary props extended from the pole or fence and looped over the cameras and lowered to varying heights in between the cameras and the subjects, depending on the artistic requirements of the director. Some of these can be dual props, serving as part of the background on one side of the turntable and as the foreground on the other side when the looped-over portion passed between the camera and the subjects. A tree or large plant with overhanging branches can be used. A lamp post with an overhanging lamp is another familiar object that will make a good dual prop.

The turntable can be fixed to the floor or the ground, or it can be mounted on wheels so that it can be moved quickly from one location with a certain type of background to another for changes of secenery.

Since the motion can be controlled readily, special monitors and viewers are not necessary for the cameras once the set-up has been made, as each shot will have perfect 3-D, as long as the color and lighting remain correct. It may be worthwhile to have one camera mounted with a 3-D monitor to make sure that the color and lighting are what is anticipated, if changes are desired in the middle of a broadcast or videotaping.

When the scene is shot, it can be viewed with glasses having one colored lens that shades the appropriate eye. However, scenes shot in this manner have great depth without the use of eye glasses, although there is more separation with the glasses.

When it is desired to shoot an episode without advocating the use of shading the appropriate eye, yet utilizing the greater in-depth perception that comes from using the turntable in the manner being taught by this invention, the constant motion required, even intermittantly and in opposite directions, can become tedious or even boring if unrelieved. However, if interspersed between conventional shots in which the camera does not move, it can offer the prospect of an even greater variety of shots than is possible today in an ordinary telecast or videotaping. If this greater variety is desired, with ordinary shots interspersed with the constantly moving deep in-depth perception shots, the turntable can be turned off for the intermittant scenes in which the cameras do not move. The cameras do not need to removed, because when the turntable is turned off, the cameras then record no motion other than that of the performers and any moving props that they require. Strict adherence to the center of the turntable by the performers is no longer necessary for these scenes.

Then, when greater in-depth perception is desired again, the performers can return to the center of the turntable, and once again, the turntable can be energized, while the cameras remain in place, which saves time. In this way a much greater variety of shots can be had for viewer enticement than is possible when shooting episodes without a turntable with cameras mounted on it to televise or videotape the performers.

When it is desired to get even greater in-depth perception, and a colored lens is used to shade the right eye, the turntable must move to the subjects right or clockwise, thus moving to the cameraman's left. For the left eye to be shaded the turntable must in the opposite direction.

BRIEF DESCRIPTION OF THE DRAWINGS

The features of the present invention which are believed to be novel are set forth with particularity in the appended claims. The present invention, both as to its organization and the manner of operation, together with further objects and advantages thereof, may be best understood by reference to the following description taken in conjunction with the accompanying drawings, in which:

DETAILED DESCRIPTION OF THE PREFERRED EMBODIMENTS

Figure 1:
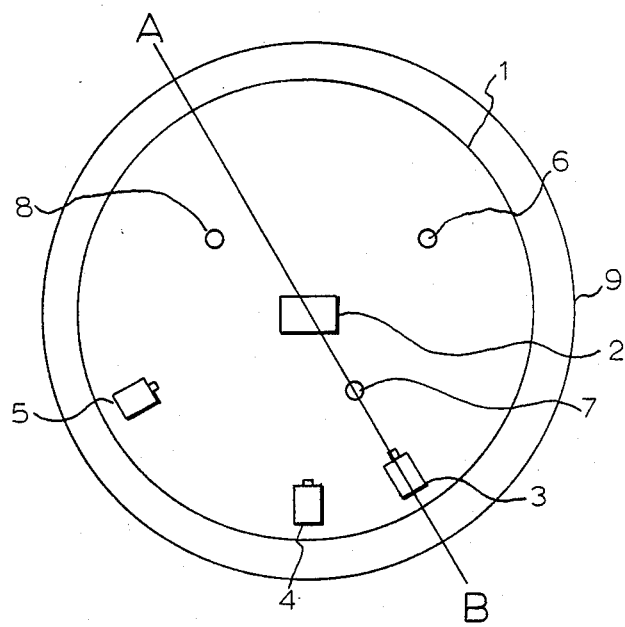
FIG. 1 is schematic drawing of the top view of the turntable.

FIG. 1 is a schematic top-view drawing of turntable, 1, and the subject, 2, being televized or videotaped sitting or standing or occupying space in the center of the turntable. Cameras, 3, 4, and 5, are mounted near the edge of the turntable so that each are out of view of the others, unless otherwise desired. Foreground props, 6, 7, and 8, are stationary and appear on the screen intermittantly between the camera and the subject. Background, 9, is stationary and is whatever is desired by the director, including scenery or an audience as long as it is compatible with 3-D requirements as to lighting and color and, obviously, surrounds the turntable, although it does not have to be uniform.

Figure 2:
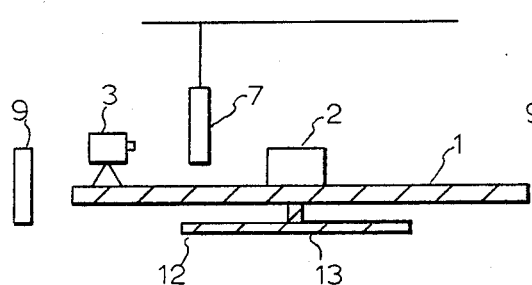
FIG. 2 is a section of FIG. 1 through AB.

FIG. 2 is the sectional view of FIG. 1 through AB in which turntable, 1, rotates about bearing means, 13, on stand, 12, which is on a stage or the ground. Prop, 7, is suspended from ceiling, 10, in between subject, 2, and camera, 3. Background, 9, can be anything the director desires, including an audience, as long as it is not of too much white, grey or black color and as long as it is lighted significantly less than the subject.

Figure 3:
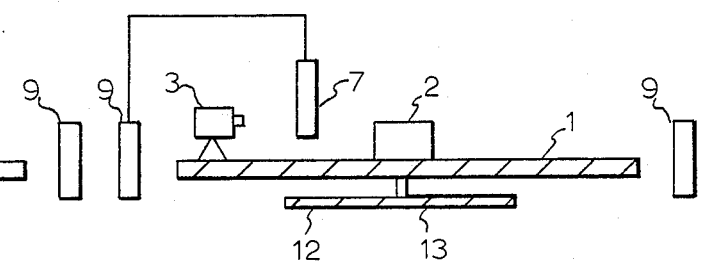
FIG. 3 is also a section of FIG. 1 thhrough AB.

FIG. 3 is sectional view like FIG. 2 except that the stationary foreground prop, 7, is supported from the background, 9, and looped over the camera, 7, so that it occupies the space between the camera and the subject. A tree with an overhanging branch makes a good prop. A lamp post with its lamp looped over the camera and hanging down would be another.

Figure 4:
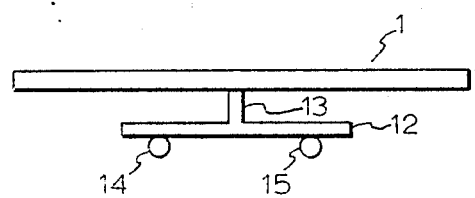
FIG. 4 is a side view of the turntable with wheels.

FIG. 4 is a side view of wheels, 14, and 15, that can support platform, 12, if mobility of the set is desired, which in turn supports bearing means, 13, which in turn supports the turntable, 1. For added support, more wheels can be used.

Figure 5:
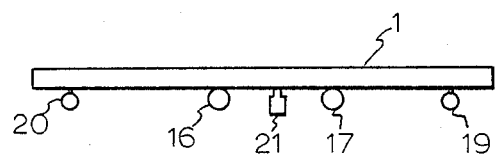
FIG. 5 is another side view of the turntable with wheels.
Figure 6:
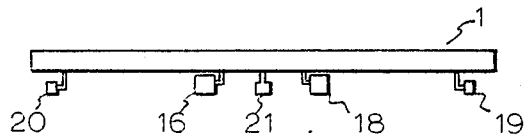
FIG. 6 is an end view of the turntable of FIG. 5 with wheels.

FIG. 5 is a side view of wheels 16, and 17, and caster wheels, 19, 20, and 21, all of which wheels directly support turntable, 1. FIG. 6 shows a frontal view of FIG. 5 in which wheel, 16 which is directly in front of wheel, 17, so it and any other wheels further behind are not shown, and wheel, 18, which also can have one or more wheels behind it, not shown, directly support the turntable along with the caster wheels, 19, 20, and 21. The wheels on each side are independently powered with respect to the other side. Therefore, the turntable can achieve rotory motion by having the wheels on one side turning forward, while the wheels on the other side are turning backwards.

While particular embodiments of the present invention have been shown and described, it will be obvious to those skilled in the art that changes and modifications may be made without departing from my invention in the broader aspects, and, therefore, the aim of the appended claims is to cover all such changes and modidications as fall within the true spirit and scope of my invention.

What is claimed:

1. The method of obtaining deep in-depth perception or 3-dimensional effects from 2-dimensional images which comprises the steps of producing proper lighting, color, and special angles for moving-picture-shooting devices, such as television cameras, videotaping cameras, and film cameras engaged in shooting such 3-D images by taking advantage of the Pulfrich illusion which is created by precise camera motion, obtained by mounting one or more cameras on top of and near the edge of a turntable, while the subect or subjects being televized or videotaped are placed at or near its center and enabling the turntable to rotate during shooting and in which a darkened lens shading one eye of the viewer at a time may be employed to enhance the 3-D effect.

2. The method according to claim 1 in which when the turntable turns clockwise, a lens shading the right eye is used, and when the turntable turns conterclockwise, a lens shading the left eye is used.

3. The method according to claim 1 in which the turntable is mounted in a fixed position on the floor or on the ground.

4. The method as in claim 1 in which in those instances when glasses are not desired to be advocated for use, but the deep in-depth perception is desired for some scenes, the turntable is turned off intermittantly for those scenes to be shot without turntable movement, then turned on again to get shots with the greater in-depth perception without having to move the cameras off the turntable.

5. The method according to claim 1 in which the center of the turntable with the subjects there is lighted more intensely than the background.

6. The method according to claim 1 in which a shaded lens covering the appropriate eye of the viewer is not used.

7. The method according to claim 1 in which the turntable is mounted on wheels.

8. The method according to claim 7 in which the turntable mounted on wheels is powered independently of the wheels.

9. The method according to claim 8 in which the wheels on one side can move indipendintly from the wheels on the other side, so by the wheels on one side going forward and the wheels on the other side going backward, rotory motion can occur, spinning the turntable by action of the wheels.

10. The method according to claim 1 in which stationary props are placed between the camera and the sugject that, as they are passed by the camera, temporarily, partially disrupt the view of the subject.

11. The method according to claim 10 in which such props are suspended from the ceiling.

12. The method according to claim 10 in which the props are secured from the surrounding background and looped over in front of the camera or cameras.

13. The method according to claim 12 in which the background is a fence-like structure from which objects are secured and looped over in front of the camera track.

14. The method according to claim 10 in which some are dual props, serving as background on one side of the turntable and, since part of it is looped over the camera track, serving as foreground on the other side when passing between subject and camera or cameras.

15. The method according to claim 14 in which the dual prop is a tree or large plant with overhanging branches.

16. The method according to claim 14 in which the dual prop is a large overhanging lamp.

* * * * *